United States Patent [19]
Baer et al.

[11] Patent Number: 5,737,247
[45] Date of Patent: Apr. 7, 1998

[54] BICYCLE ACCESSORY WITH VOICE SYNTHESIS CAPABILITY

[75] Inventors: Ralph Baer, Delray Beach, Fla.; Philip E. Orbanes, Topsfield, Mass.; Mark Ragoza, West Hatfield, Mass.; James P. Ryan, Holyoke, Mass.

[73] Assignee: Phil Orbanes Productions, Inc., Topsfield, Mass.

[21] Appl. No.: 627,447

[22] Filed: Apr. 4, 1996

[51] Int. Cl.[6] .................................................. G01C 21/10
[52] U.S. Cl. .......................... 364/565; 280/288.4; 379/88; 340/432; 340/825.36
[58] Field of Search ..................................... 340/432, 462, 340/825.36; 379/88; 395/2.83, 2.67; 280/288.4; 364/410, 443, 565, 928; 434/61; 377/24.2; 324/166, 174

[56] References Cited

U.S. PATENT DOCUMENTS

| | | |
|---|---|---|
| 3,832,634 | 8/1974 | Galea . |
| 4,071,892 | 1/1978 | Genzling ................................ 364/424 |
| 4,334,190 | 6/1982 | Sochaczeyski . |
| 4,352,063 | 9/1982 | Jones et al. . |
| 4,592,317 | 6/1986 | Wrobel . |
| 4,780,864 | 10/1988 | Houlihan . |
| 4,867,442 | 9/1989 | Matthews ............................... 128/700 |
| 4,887,249 | 12/1989 | Thinesen . |
| 4,911,005 | 3/1990 | Heyn et al. ............................... 73/187 |
| 5,137,501 | 8/1992 | Mertesdorf . |
| 5,335,188 | 8/1994 | Brisson ................................... 364/565 |
| 5,385,519 | 1/1995 | Hsu et al. . |

Primary Examiner—James P. Trammell
Assistant Examiner—Craig Steven Miller
Attorney, Agent, or Firm—Marshall, O'Toole, Gerstein, Murray & Borun

[57] ABSTRACT

An accessory adapted to be mounted to a bicycle having the capability of generating audible voice messages based on various parameters sensed by the accessory. The bicycle accessory includes sensing means adapted to be mounted to a bicycle having at least two wheels for generating a signal relating to an operational parameter of the bicycle, input means mounted to the bicycle for allowing the rider to make a request for the current state of the parameter, and means for determining the current state of the parameter in response to the request made by the rider, the current state of the parameter being determined by a microcontroller based upon at the signal generated by the sensing means. The accessory also includes means for generating an audible voice message relating to the current state of the parameter in response to the request made by the user.

12 Claims, 7 Drawing Sheets

BICYCLE ACCESSORY WITH VOICE SYNTHESIS CAPABILITY

BACKGROUND OF THE INVENTION

The present invention is directed to accessories adapted to be mounted to bicycles for detecting a parameter relating to the operation of the bicycle and generating an indication to the rider of the current state of the parameter.

Various bicycle accessories which detect a parameter relating to the operation of the bicycle have been designed or marketed. For example, speedometers have been incorporated on bicycles which generate a visual indication of the bicycle speed and which include odometers which keep track of the distance the bicycle has been ridden. Also, electronic altimeters have been marketed to mountain bikers for generating visual indications relating to altitude.

U.S. Pat. No. 4,071,892 to Genzling discloses a bicycle accessory which detects and keeps track of such parameters as speed, distance, and elapsed time. U.S. Pat. No. 4,352,063 to Jones, et al. discloses a speedometer/odometer system for use on a bicycle for generating visual indications of the speed of the bicycle and the distance through which the bicycle has been ridden. U.S. Pat. No. 4,780,864 to Houlihan discloses a combination wristwatch and bicycle computer which displays speed, distance and pedaling cadence when temporarily attached to the handlebars of the bicycle.

SUMMARY OF THE INVENTION

The invention is directed to an accessory adapted to be mounted to a bicycle which has the capability of generating audible voice messages based on various parameters sensed by the accessory. The generation of audible voice messages to the rider of the bicycle is advantageous in that the rider may be informed of the current state of various parameters without the need to take his or her eyes off the road while riding.

The bicycle accessory includes sensing means adapted to be mounted to a bicycle for generating a signal relating to an operational parameter of the bicycle, input means mounted to the bicycle for allowing the rider to make a request for the current state of the parameter, and means for determining the state of the parameter in response to the request made by the rider, the state of the parameter being determined based upon at the signal generated by the sensing means. The accessory also includes means for generating an audible voice message relating to the current state of the parameter in response to the request made by the user.

The means for generating the audible voice message may includes means for electronically storing a plurality of sets electronic digitized voice data relating to the parameter, means for selecting one of the sets of digitized voice data based upon the state of the parameter determined by the determining means, and means for converting the set of digitized voice data into the audible voice message.

The sensing means senses the state of various parameters, such as speed, temperature, the angle of inclination of the bicycle, atmospheric pressure, the proximity of motor vehicles approaching from the rear of the bicycle, and the direction, i.e. compass heading, in which the bicycle is being ridden.

The bicycle accessory may include sensing means for generating a plurality of successive signals when the bicycle is being ridden, the successive signals having a variable periodicity based upon the speed of the bicycle, and input means mounted to the bicycle for allowing the rider to make a plurality of different types of requests such as a speed request, a distance request, a time request, and others.

The accessory may have a source of battery power and means for determining the speed of the bicycle in response to the speed request made by the rider, the speed being determined based upon at least two of the signals generated by the sensing means. The accessory may include means for determining a distance through which the bicycle has been ridden in response to the distance request made by the rider, the distance being determined based upon the signals generated by the sensing means, means for determining an elapsed time in response to the time request made by the rider, and means for generating a audible voice messages which indicates the distance, speed or elapsed time in response to one of requests made by the user.

These and other features and advantages of the present invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENTS

Figure 1:
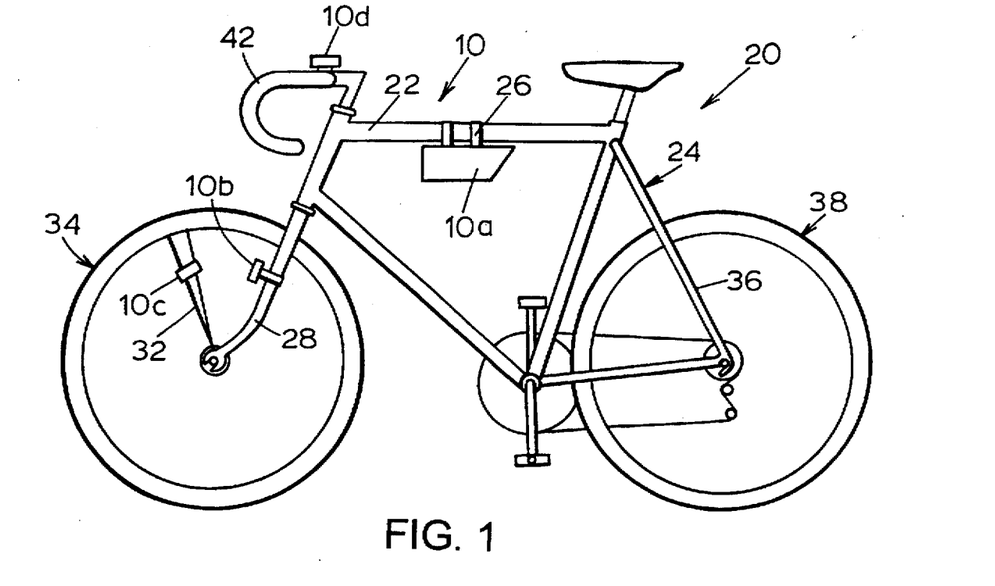
FIG. 1 illustrates a bicycle having an accessory with voice synthesis capability in accordance with the invention.

A preferred embodiment of a bicycle accessory 10 shown mounted to a bicycle 20 is shown in FIG. 1. Referring to FIG. 1, the accessory 10 includes a main module 10a mounted to the top tube 22 of the bicycle frame 24 via a pair of mounting brackets 26. Although the accessory 10 is shown mounted to one type of bicycle in FIG. 1, it could be mounted to other types of bicycles such as mountain bikes or children's bikes, for example. As used herein, the term "bicycle" includes exercise bikes, two-wheeled bicycles, and tricycles.

The main module 10a is electronically coupled, via a wire 30 (shown schematically in FIG. 3), to a conventional magnetically activated sensor 10b attached to the bicycle fork 28. A magnet 10c is mounted between two spokes 32 of the front wheel 34 of the bicycle 20 at the same elevation of the sensor 10b. Each time the magnet 10c passes by, the sensor 10b generates an electronic magnet-detect signal from which speed and distance information can be determined, as described below. Although shown mounted adjacent the front wheel 34, the sensor 10b could be mounted on a rear stay 36 adjacent the rear wheel 38, with the magnet 10c mounted between two spokes of the rear wheel 38. The sensor 10b may be a reed switch, a Hall-effect sensor, or electro-optical means for detecting wheel rotation.

Figure 3:
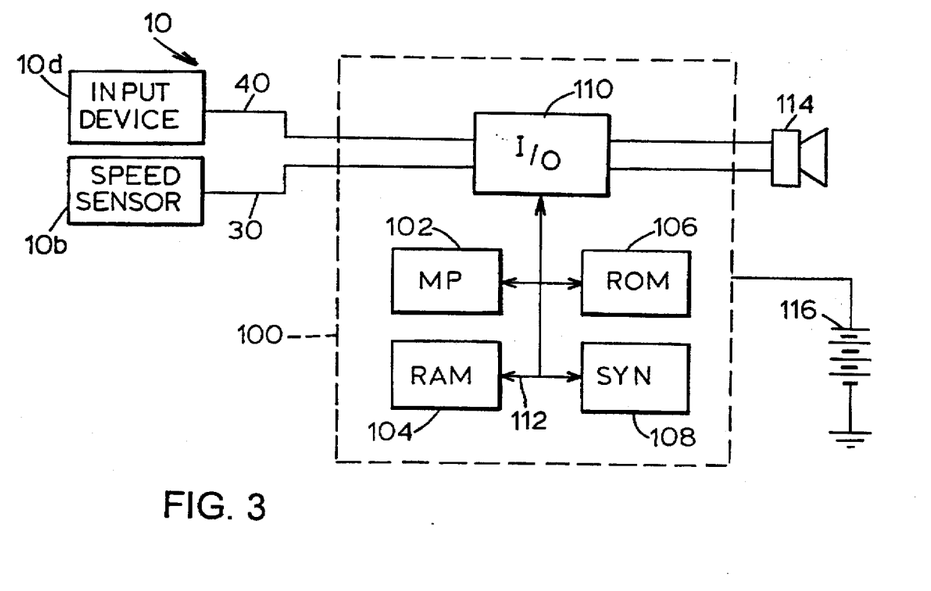
FIG. 3 is a block diagram of the electronics of the bicycle accessory.

The main module 10a is electronically coupled to an input device 10d via a wire 40 (shown schematically in FIG. 3). The input device 10d, which is shown mounted to the handlebars 42, allows the rider to make various requests for information, which requests include a request for an announcement of the distance the bicycle 20 has travelled since a starting time, a request for an announcement of the current speed at which the bicycle 20 is being ridden, a request for the announcement of the time elapsed since the starting time, and a request for the generation of an audible horn signal.

Figure 2:
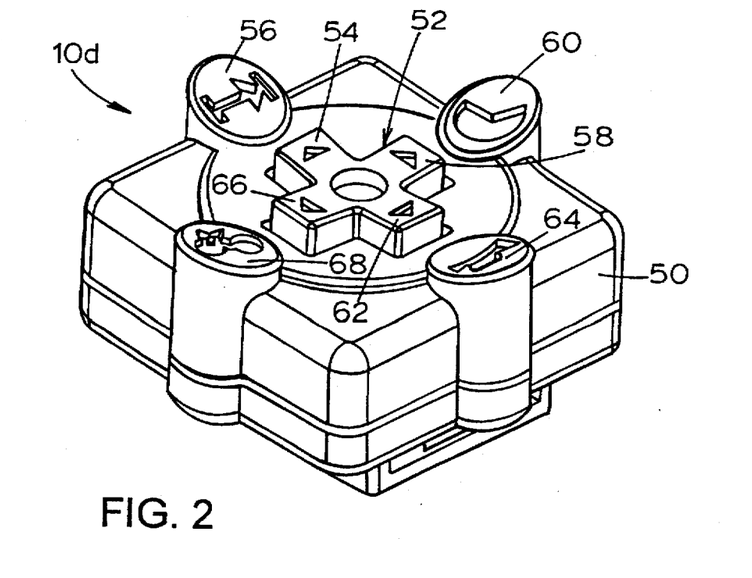
FIG. 2 is a perspective view of an input device which forms part of the bicycle accessory of FIG. 1.

FIG. 2 illustrates one embodiment of the input device 10d in detail. Referring to FIG. 2, the input device 10d has a plastic housing 50, a four-way toggle switch 52 having an up-arrow arm 54 disposed adjacent a distance indicator 56 for making a distance request, a right-arrow arm 58 disposed adjacent a time indicator 60 for making a time request, a down-arrow arm 62 disposed adjacent a horn indicator 64 for making a sound-horn request, and a left-arrow arm 66 disposed adjacent a speed indicator 68 for making a speed request. Upon the rider making a request by depressing one of the arms 54, 58, 66, the accessory 10 generates an audible voice message in response. For example, in response to a speed request, the accessory 10 audibly announces the current speed of the bicycle 20. By way of example, this announcement might be "Your speed is 25 miles per hour."

FIG. 3 is a block diagram of the electronics of the bicycle accessory 10. Referring to FIG. 3, the accessory 10 has a microcontroller 100 having a microprocessor (MP) 102, a random-access memory (RAM) 104, a read-only memory (ROM) 106, a voice synthesizer (SYN) 108, and an input/output (I/O) circuit 110, all of which are interconnected via an address/data bus 112.

The microcontroller 100 is connected to a conventional speaker or transducer 114 for converting electronic signals into audio signals and is powered by a source of electrical power, which may be composed of one or more batteries 116, for example. The microcontroller 100, which may be a conventional integrated circuit chip, such as a TSP50Cxx series commercially available from Texas Instruments, which includes both conventional microprocessor functionality and voice synthesis capability.

Operation

Figure 4:
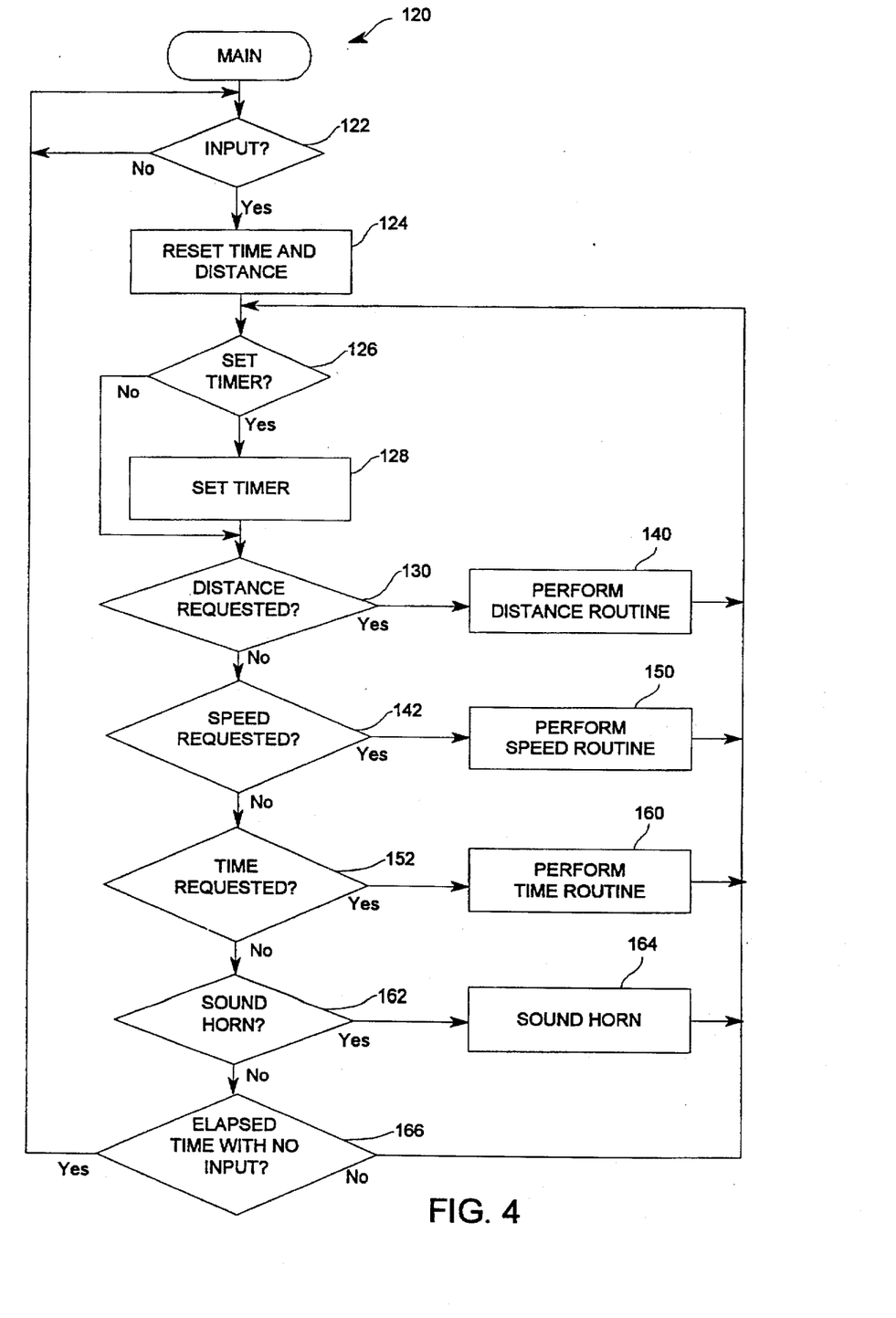
FIG. 4 is a flowchart of the overall operation of the bicycle accessory.

FIG. 4 is a flowchart of a main operating routine 120 of a computer program stored in the ROM 106 and executed by the microprocessor 102. The microcontroller 100 is operable in an active mode in which it performs various functions and responds to rider inputs and a sleep mode in which only limited functions are performed to save battery power.

Referring to FIG. 4, step 122 represents a sleep mode in which the microcomputer 100 waits for any input. If the bicycle accessory 10 has not been operated for a predetermined period of time, such as one hour, the microcomputer 100 will be in the sleep mode at step 122. Upon the receipt of any input at step 122, such as the depression of a start/reset button (not shown) on the main module 10a or the generation of a magnet-detect signal by the sensor 10b, the microcontroller 100 exits the sleep mode by branching to step 124.

The bicycle accessory 10 keeps track of the amount of time and the distance that the bicycle 20 has been ridden. A software timer in the microcontroller 100 is used to measure the time, and a software counter in the microcontroller 100 keeps track of the distance by counting the number of magnet-detect signals generated by the sensor 10b. At step 124, both the time and the distance are reset to zero by resetting both the software timer and the counter to zero.

A timer button (not shown) on the main module 10a may be pressed to allow the rider to enter a predetermined time period, such as one-half hour. Upon the expiration of the time period, an audio signal is generated to advise the rider that the time period has expired. At step 126, if the timer button is pressed, the program branches to step 128 where the rider sets the timer to a predetermined time period. Setting the timer may be performed in any conventional manner via the toggle switch 52. For example, when the timer button is pressed, the accessory 10 may generate an audible voice message to the rider via the speaker 114 that says "Enter Hours," after which the rider will press the up-arrow arm 54 once for each desired hour. After the hours are entered, the accessory 10 may generate an audible voice message to the rider via the speaker 114 that says "Enter Minutes," after which the rider will press the up-arrow arm 54 once for each desired minute. Other ways of programming the timer could be utilized.

At step 130, if a distance request is made by the rider (by depressing the up-arrow arm 54 shown in FIG. 2), the program branches to step 140 where a distance routine is performed. As described below, the distance routine 140 calculates the distance the bicycle 20 has been ridden since the distance was reset at step 124 and generates an audible voice message via the speaker 114 announcing that distance to the rider. As used herein, the term "audible voice message" may consist of an audible word, phrase, sentence or combination thereof generated by some type of electronic voice synthesis that emulates human speech.

At step 142, if a speed request is made by the rider (by depressing the left-arrow arm 66 shown in FIG. 2), the program branches to step 150 where a speed routine is performed. As described below, the speed routine 150 calculates the current speed of the bicycle 20 and generates an audible voice message via the speaker 114 announcing that speed to the rider.

At step 152, if a time request is made by the rider (by depressing the right-arrow arm 58), the program branches to step 160 where a time routine is performed. As described below, the time routine 160 generates an audible voice message via the speaker 114 announcing the time which has elapsed since the timer was reset at step 124.

At step 162, if a horn request is made by the rider (via the down-arrow arm 62 shown in FIG. 2), the program branches to step 164 where the microcontroller 100 causes the speaker 114 to generate an audible horn signal.

At step 166, if a predetermined period of time, such as one hour, has elapsed without the rider inputting any request and without the sensor 10b detecting rotation of the wheel 34 via the magnet 10c, the program branches to the sleep mode at step 122 to preserve battery power. Otherwise, the program branches back to step 126 to respond to rider requests as described above.

The distance, speed and time routines 140, 150, 160 generate various audible voice messages via the voice synthesizer 108 and the speaker 114. During its manufacture, the microcomputer 100 is programmed in a conventional manner by storing digitized voice data in the ROM 106 for all the audible voice messages to be generated during operation of the accessory 10.

The bicycle accessory 10 includes a set of digitized voice data for each of the following audible voice messages: the numbers zero through 19; the numbers 20, 30, 40, 50, 60, 70, 80, 90; and various words and phrases including "miles,"

"miles per hour," "hours," "minutes," "seconds," and "point." A memory address label uniquely identifies the memory location of the digitized voice data for each audible voice message. For example, the address label "twenty" identifies the memory location of the digitized voice data for the number 20.

Distance Routine

Figure 5:
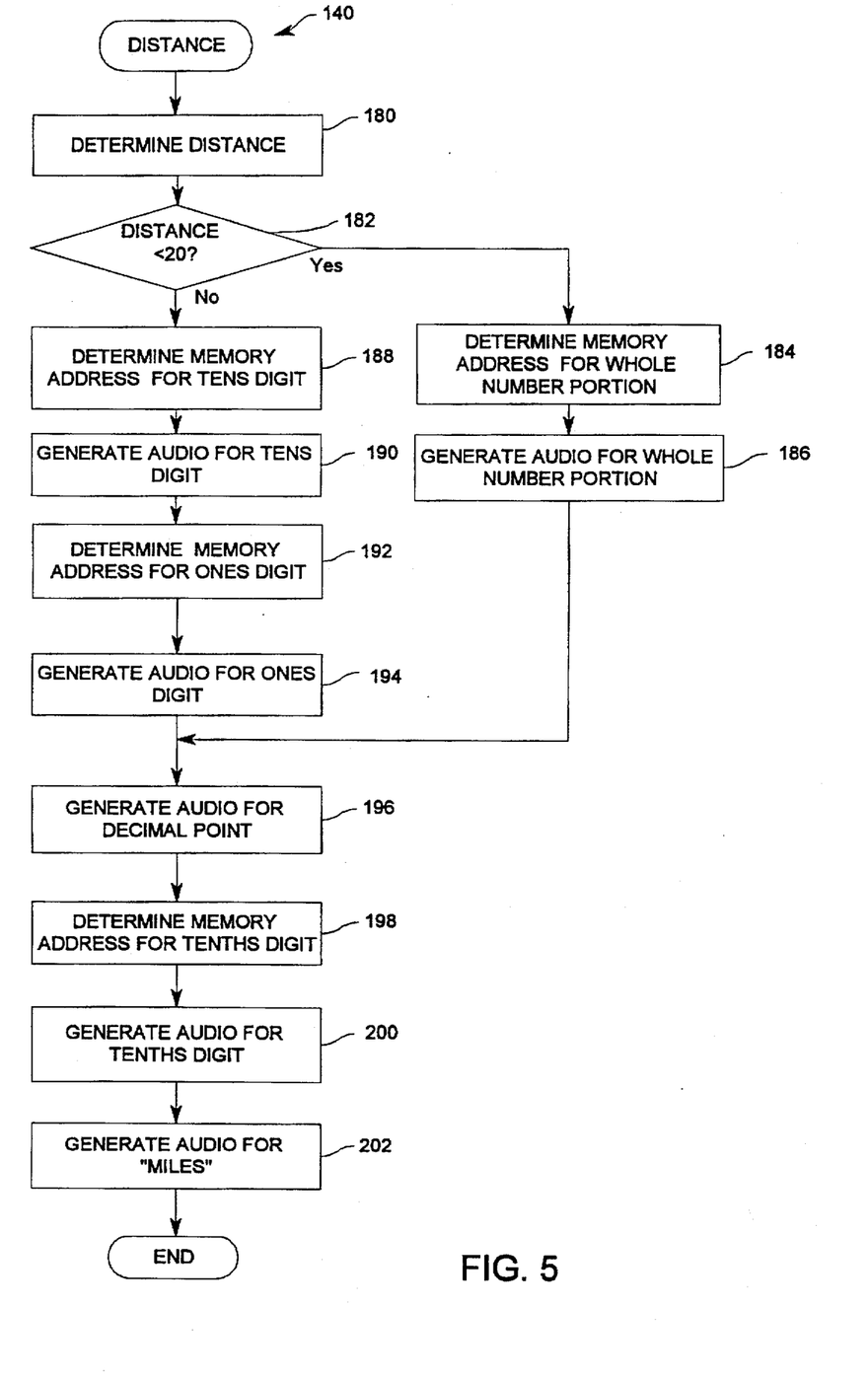
FIG. 5 is a flowchart of a distance routine shown schematically in FIG. 4.

FIG. 5 is a flowchart of the distance routine 140 schematically shown in FIG. 4. Referring to FIG. 5, at step 180 the distance that the bicycle 20 has been ridden since the distance was reset to zero at step 124 of FIG. 4 is determined based upon the number of magnet-detect signals generated by the sensor 10b due to the magnet 10c passing by it. The distance is determined by multiplying the circumference of the bicycle wheel 34 by the number of magnet-detect signals generated, each of which represents one revolution of the wheel 34, and is computed to the nearest tenth of a mile. The diameter of the wheel 34 can be input by the rider via the input device 10d prior to operating the bicycle accessory 10, or the accessory 10 can be pre-programmed for a particular wheel diameter.

At step 182, if the distance is less than 20 miles, the program branches to step 184 where the memory address for the whole number portion of the distance is determined. For example, if the distance is 17.4, the memory address corresponding to the digitized voice data for the number 17 is selected. At step 186, the audible voice message for the whole number portion of the distance is generated via the speaker 114 based upon the digitized voice data specified by the address determined at step 184.

If the distance was not less than 20 miles as determined at step 182, the program branches to step 188 where the memory address for the "tens" digit of the distance is determined. For example, if the distance is 32.6, the memory address corresponding to the digitized voice data for the number 30 is selected at step 188. At step 190, the audible voice message for the "tens" digit of the distance is generated via the speaker 114 based upon the digitized voice data specified by the address determined at step 188.

At step 192, the memory address for the "ones" digit of the distance is determined. For example, if the distance is 32.6, the memory address corresponding to the digitized voice data for the number two is selected. At step 194, the audible voice message for the "ones" digit is generated via the speaker 114 based upon the digitized voice data specified by the memory address.

At step 196, the audible voice message for "point" is generated based upon digitized voice data for the word "point," and then at step 198 the memory address for the "tenths" digit of the distance is determined. If the distance is 32.6, the memory address corresponding to the digitized voice data for the number six is selected in this case. At step 200, the audible voice message for the "tenths" digit is generated via the speaker 114, and at step 202 the audible voice message for the word "miles" is generated based upon digitized voice data for that word.

Speed Routine

Figure 6:
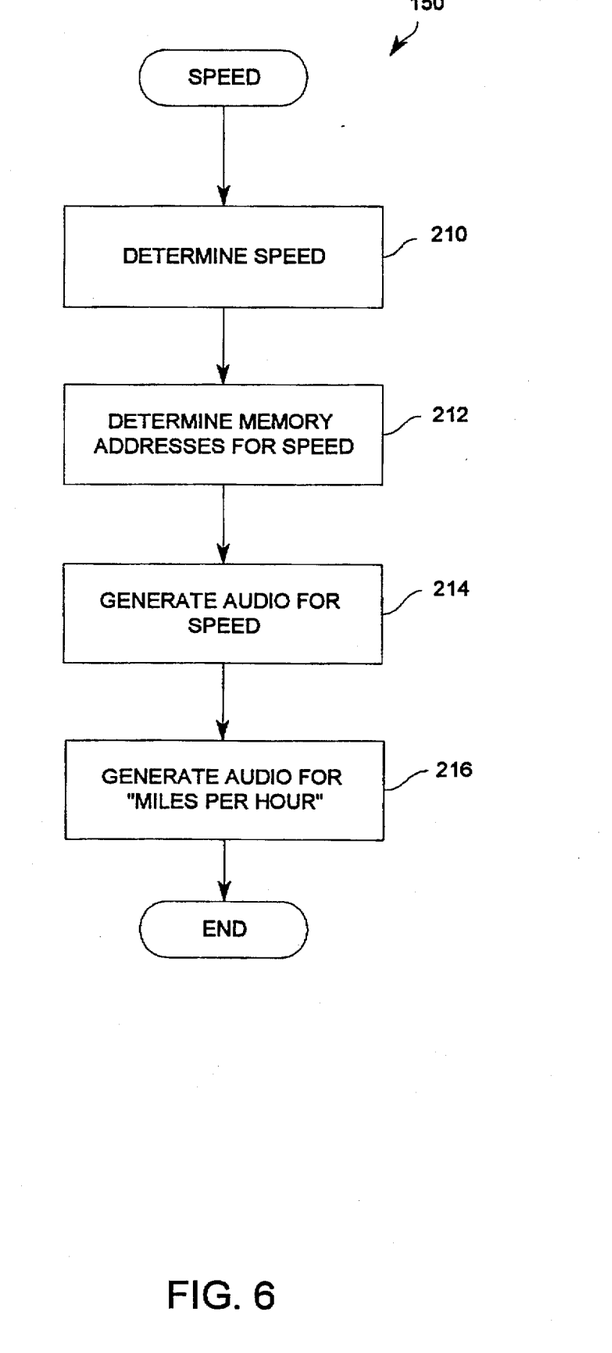
FIG. 6 is a flowchart of a speed routine shown schematically in FIG. 4.

FIG. 6 is a flowchart of the speed routine 150 schematically shown in FIG. 4. Referring to FIG. 6, at step 210 the current speed at which the bicycle 20 is being ridden is determined based upon the time that elapses between the generation of successive magnet-detect signals by the sensor 10b, the circumference of the wheel 34, and a conversion factor that converts the result to miles per hour. The speed is then announced to the nearest whole number.

At step 214, the memory address(es) for the speed are retrieved from a lookup table in the ROM 106. Each entry in the lookup table has either one or two memory addresses which are identified by a lookup table address. For example, for a speed of 23 miles per hour, the lookup table would have a first memory address which specifies the location in the ROM 106 of the digitized voice data for the number "20" and a second memory address which specifies the location in the ROM 106 of the digitized voice data for the number "3." The location of those two memory addresses in the lookup table is specified by a lookup table address of "23."

For a speed of 19 miles per hour, the lookup table would have a single memory address which specifies the location in the ROM 106 of the digitized voice data for the number "19." The location of that memory address is specified by a lookup table address of "19."

At step 214, an audible voice message for the speed determined at step 210 is generated via the speaker 114 based upon the one or two sets of digitized voice data specified by the one or two memory addresses determined at step 212. At step 216, the audible voice message for the phrase "miles per hour" is generated based upon digitized voice data stored in the ROM 106 for that phrase.

Time Routine

Figure 7:
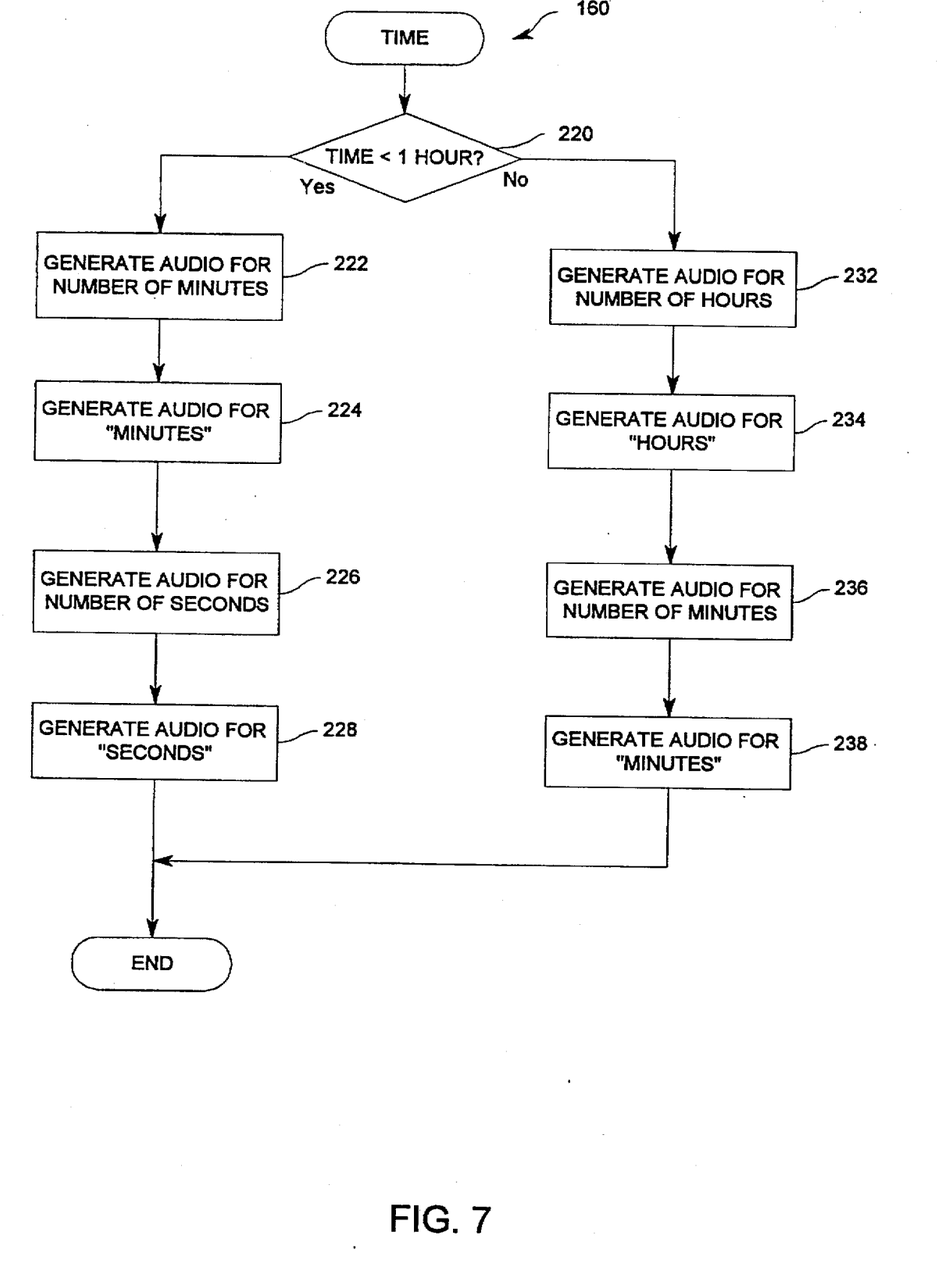
FIG. 7 is a flowchart of a time routine shown schematically in FIG. 4.

FIG. 7 is a flowchart of the time routine 160 shown schematically in FIG. 4. Upon the generation of a time request by the rider, the time routine 160 audibly announces the elapsed time since the time was reset at step 124 of FIG. 4. If the elapsed time is greater than one hour, the time is announced in hours and minutes. If the elapsed time is less than one hour, the time is announced in minutes and seconds.

Referring to FIG. 7, if the current time (as determined by the software timer) is less than one hour, the program branches to step 222, where an audible voice message for the number of minutes is generated via the speaker 114. The manner in which step 222 is performed is identical to the performance of steps 182–194 of FIG. 5 described above. At step 224, the speaker 114 generates the audible voice message for "minutes."

At step 226, an audible voice message for the number of seconds is generated via the speaker 114. Step 226 is performed in the same manner as step 222. At step 228, the speaker 114 generates the audible voice message for "seconds."

If the elapsed time was not less than one hour as determined at step 220, the program performs steps 232–238 to cause the current time in hours and minutes to be audibly announced to the rider. Steps 232–238 are performed in an analogous manner to steps 222–228.

Additional Features

The bicycle accessory 10 described above includes additional functions not described above, such as an alarm capability (when the alarm feature is activated, rotation of the wheel 34 as detected by the sensor 10b will cause an audible alarm to be generated). The distance and speed routines described above could be programmed to output in either miles or kilometers, as selected by the rider. The accessory 10 could allow the rider to select different horn sounds, each of which is generated from a unique set of digitized data, and the program 120 could require a personal identification number (PIN) to be entered to prevent the bicycle accessory from being programmed by unauthorized users.

Additional Embodiments

The invention may be used in a number of additional bicycle accessory embodiments, which are shown in FIGS. 8–13. Each of these embodiments utilizes a microcontroller identical to the microcontroller 100 shown in FIG. 3 (except for differences in programming), and each of these additional embodiments generates audible voice messages in the manner described above. All of the embodiments of FIGS. 8–13 are adapted to be mounted to a bicycle via conventional mounting means, such as the module 10a and clamps 26 shown in FIG. 1, and have an input device adapted to be mounted to the bicycle handlebars, which may be identical or similar to the input device 10d of FIG. 1.

Figure 8:
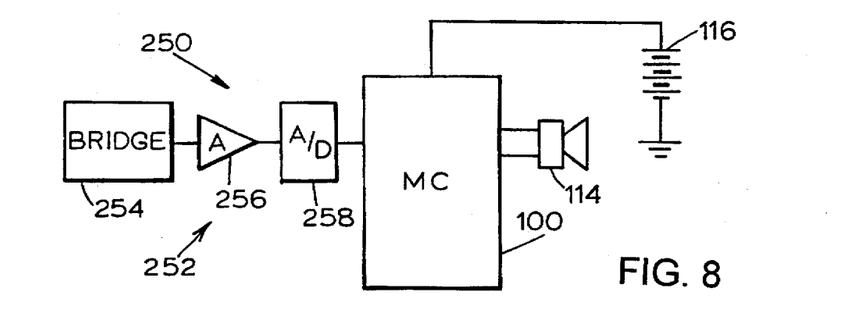
FIGS. 8–13 illustrate additional embodiments of bicycle accessories in accordance with the invention.

FIG. 8 illustrates a bicycle accessory 250 which has an atmospheric pressure sensing circuit 252 which may be used to generate one or more altitude signals to keep track of the current altitude of the bicycle or a change in altitude of the bicycle. For example, when used on a mountain bike, the accessory 250 may keep track of the total vertical feet that the bicycle has been ridden.

The pressure-sensing circuit 252 is composed of a conventional bridge circuit 254 connected to an amplifier 256 which generates an analog signal that is output to an analog-to-digital (A/D) converter 258 connected to the microcontroller 100. The bridge circuit 254 may be of the strain-gauge type provided by a single integrated circuit chip.

When the rider makes an altitude request by pressing an input button, the microcontroller 100 calculates the altitude in a conventional manner and generates an audible voice message via the speaker 114 to announce the altitude to the rider. A second input button may be provided to request announcement of the total accumulated vertical feet travelled by the bicycle 20.

Figure 9:
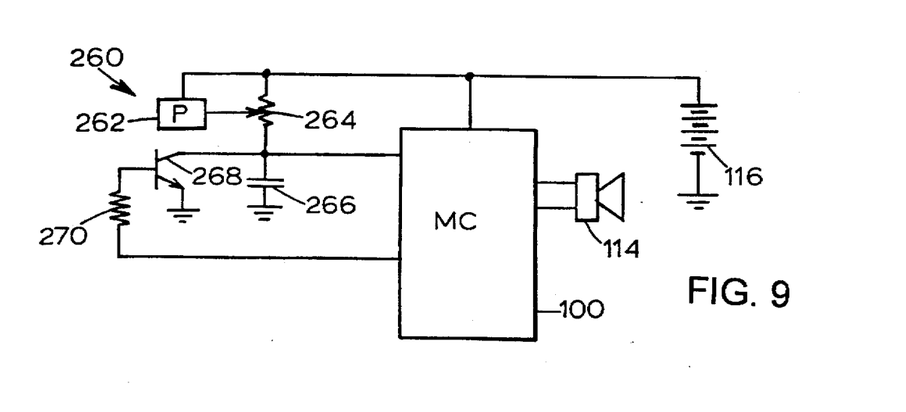

FIG. 9 illustrates a bicycle accessory 260 which has an inclination sensor 262 which may be used to generate an inclination signal which indicates the steepness or grade of the road or other surface on which the bicycle is being ridden.

The inclination sensor 262 may be composed of a weighted pendulum which moves under the influence of gravity, the pendulum being connected to the shaft of a potentiometer 264. A capacitor 266 is charged by a current which passes through the potentiometer 264, the rate of charging of the capacitor 266 being indicative of the angle of inclination. The capacitor 266 may be discharged via a discharge circuit composed of a transistor 268 and a resistor 270.

When the rider makes an inclination request by pressing an input button, the microcontroller 100 turns the transistor 268 on to discharge the capacitor 266. The transistor 268 is then turned off by the microcontroller 100, which starts an internal counter (not shown) at the same time, and then the capacitor 266 starts to charge up via the potentiometer 264. When the voltage on the capacitor 266 reaches a predetermined threshold, e.g. five volts, the internal counter is stopped. The count at which the counter is stopped is indicative of how rapidly the capacitor 266 was charged (which depends on the resistance value of the potentiometer 264), and is thus also indicative of the angle of inclination. Based upon the count at which the counter was stopped, an audible voice message is generated via the speaker 114 to announce the angle of inclination to the rider. In addition to or instead of announcing the angle of inclination, other messages could be announced, such as "Steep climb, take it easy!"

Figure 10:
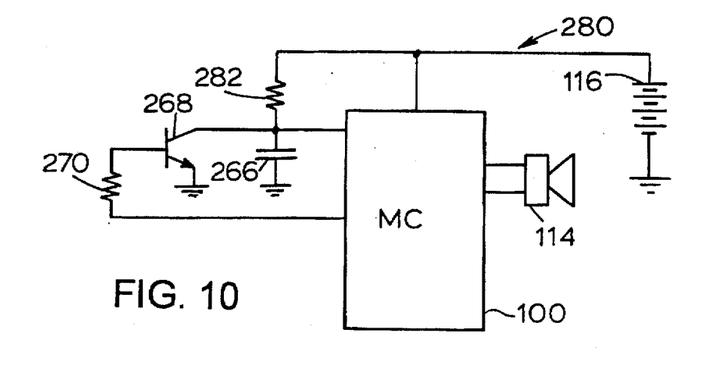

FIG. 10 illustrates a bicycle accessory 280 which has a temperature sensor 282 which may be used to allow the microcontroller 100 to generate ambient-temperature related data. The bicycle accessory 280 is substantially the same as the accessory 260 of FIG. 9, except that the temperature sensor 282 is used in place of the inclination sensor 262 of FIG. 9. The operation of the accessory 280 is also substantially the same, except that it generates an audible voice message via the speaker 114 to announce the current temperature in response to a temperature request made by the rider via an input button.

Figure 11:
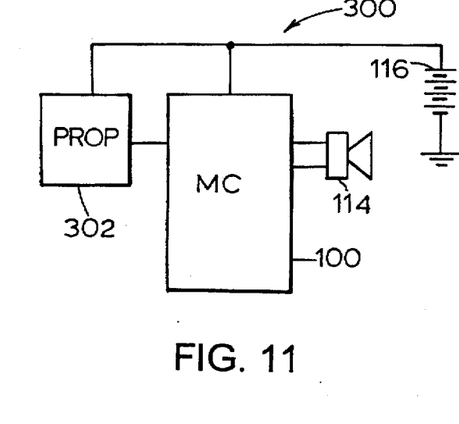

FIG. 11 illustrates a bicycle accessory 300 which has a speed detector in the form of a lightweight propeller shown schematically at 302 which may be mounted to the handlebars 42. One of the propeller blades may have a small magnet attached thereto (with the opposite side blade having a balancing counterweight) which passes by a magnetic reed switch to generate signals at a rate proportional to the rotational speed of the propeller 302, which is a function of the bicycle speed and the wind speed. The accessory 300 generates various audible voice messages via the speaker 114 in response to various speeds indicated by the propeller 302, such as the speed or comical messages such as "What are you stopping for?"

Figure 12:
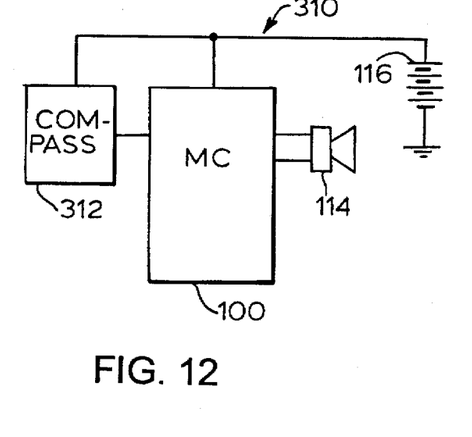
Figure 13:
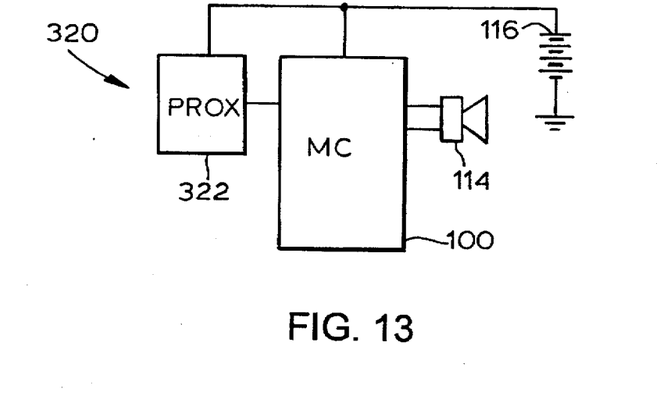

FIG. 12 illustrates a bicycle accessory 310 which has a direction detector in the form of a compass shown schematically at 312 which may be mounted to the handlebars 42. The compass 312 may be composed of conventional digital compass sensors of the type employed in automobiles, such as Type 1490 commercially available from Dinsmore Company of Flint, Mich. Such a device may employ a cylindrical, axially pivoted magnet which aligns with the earth's magnetic field. One or two of four Hall-effect sensors facing the magnet at 90° intervals are turned on, depending on the relative position of the magnet and the four Hall-effect sensors, which is sufficient to distinguish the eight main compass headings: N, NE, E, SE, S, SW, W, and NW. The microprocessor 100 may compare the directional 4-bit code generated by the compass 312 with eight possible codes to determine the bicycle's compass heading and retrieve the digitized voice data for the direction sensed by the compass. The accessory 310 then generates an audible voice message via the speaker 114, such as "You are heading North."

FIG. 12 illustrates a bicycle accessory 320 which has a conventional proximity detector 322 which may be composed of a transmitter mounted to generate infrared, ultrasonic or microwave signals rearwardly from the bicycle and a receiver for detecting reflections of the transmitted signals to determine whether any objects, such as cars, are in close proximity to the bicycle. In the event an object is detected in close proximity to the bicycle, a suitable audible voice message warning the rider of the object may be generated by the speaker 114.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus adapted to be mounted to a bicycle, said apparatus comprising:

sensing means adapted to be mounted to a bicycle for generating a plurality of successive signals when the bicycle is being ridden by a rider at a speed, said successive signals having a variable periodicity based upon said speed of the bicycle;

input means mounted to the bicycle for allowing the rider to make a plurality of different types of parametric requests, said requests including a speed request, a distance request, and a time request;

means for determining said speed of the bicycle in response to said speed request made by said rider, said speed being determined based upon at least two of said signals generated by said sensing means;

means for determining a distance through which the bicycle has been ridden in response to said distance request made by said rider, said distance being determined based upon said signals generated by said sensing means;

means for determining an elapsed time in response to said time request made by said rider;

means for generating a first audible voice message which indicates said speed;

means for generating a second audible voice message which indicates said distance; and means for generating a third audible voice message which indicates said elapsed time.

2. An apparatus as defined in claim 1 wherein said sensing means comprises a magnet adapted to be connected to a wheel of the bicycle and a magnetically activated sensor adapted to be connected to a frame portion of the bicycle.

3. An apparatus as defined in claim 1 wherein said means for determining said speed of the bicycle comprises means for determining said speed based upon an elapsed time between two of said successive signals generated by said sensing means.

4. An apparatus as defined in claim 1 wherein said means for determining said distance comprises means for counting said successive signals generated by said sensing means.

5. An apparatus as defined in claim 1 wherein said means for generating said first audible voice message comprises:

means for electronically storing a plurality of sets of digitized voice data relating to speed;

means for selecting one of said sets of digitized voice data based upon said speed determined by said speed-determining means; and means for converting said one set of digitized voice data into said first audible voice message.

6. An apparatus as defined in claim 1 wherein said means for generating said second audible voice message comprises:

means for electronically storing a plurality of sets of digitized voice data relating to distance;

means for selecting one of said sets of digitized voice data based upon said distance determined by said distance-determining means; and means for converting said one set of digitized voice data into said second audible voice message.

7. An apparatus as defined in claim 1 wherein said means for generating said third audible voice message comprises:

means for electronically storing a plurality of sets of digitized voice data relating to time;

means for selecting one of said sets of digitized voice data based upon said elapsed time; and means for converting said one set of digitized voice data into said third audible voice message.

8. An apparatus as defined in claim 1 wherein said means for determining said speed of the bicycle comprises a microprocessor.

9. An apparatus as defined in claim 1 wherein said means for generating said audible voice messages comprise a voice synthesizer.

10. An apparatus adapted to be mounted to a bicycle, said apparatus comprising:

sensing means adapted to be mounted to a bicycle for generating a signal relating to an operational parameter of the bicycle;

input means mounted to the bicycle for allowing the rider to make a request for the current state of said parameter;

means for determining the current state of said parameter in response to said request made by said rider, the current state of said parameter being determined based upon said signal generated by said sensing means;

means for generating an audible voice message relating to the current state of said parameter.

11. An apparatus as defined in claim 10 wherein said means for generating said audible voice message comprises:

means for electronically storing a plurality of sets of digitized voice data relating to said parameter;

means for selecting one of said sets of digitized voice data based upon the current state of said parameter determined by said determining means; and means for converting said one set of digitized voice data into said audible voice message.

12. An apparatus as defined in claim 10 wherein said sensing means comprises means for sensing the speed of the bicycle.

* * * * *